(12) United States Patent
Hornung et al.

(10) Patent No.: US 7,893,592 B2
(45) Date of Patent: Feb. 22, 2011

(54) ELECTRIC MOTOR WITH HAMMER BRUSHES

(75) Inventors: Stefan Hornung, Leinfelden-Echterdingen (DE); Thomas Huck, Rheinmuenster (DE); Tarek Mili, Karlsruhe (DE); Armin Niederer, Karlsruhe (DE); Diyap Bueyuekasik, Buehl (DE); Lars-Dirk Anding, Nagold (DE)

(73) Assignee: Robert Bosch GmbH, Stuttgart (DE)

( * ) Notice: Subject to any disclaimer, the term of this patent is extended or adjusted under 35 U.S.C. 154(b) by 170 days.

(21) Appl. No.: 11/997,006

(22) PCT Filed: Aug. 16, 2006

(86) PCT No.: PCT/EP2006/065365

§ 371 (c)(1),
(2), (4) Date: Jul. 3, 2008

(87) PCT Pub. No.: WO2007/039341

PCT Pub. Date: Apr. 12, 2007

(65) Prior Publication Data

US 2009/0134743 A1 May 28, 2009

(30) Foreign Application Priority Data

Sep. 30, 2005 (DE) ............ 10 2005 047 428

(51) Int. Cl.
*H02K 13/00* (2006.01)

(52) U.S. Cl. ............ 310/244; 310/239; 310/240; 310/241; 310/242; 310/243

(58) Field of Classification Search ........... 310/239, 310/242, 243, 244
See application file for complete search history.

(56) References Cited

U.S. PATENT DOCUMENTS

| 6,400,058 | B1 * | 6/2002 | Liau ............ 310/239 |
| 6,858,955 | B2 * | 2/2005 | Lau ............ 310/51 |
| 2001/0021610 | A1 * | 9/2001 | Otsuki et al. ...... 439/751 |
| 2002/0163280 | A1 * | 11/2002 | Nakajima et al. ...... 310/239 |
| 2005/0264127 | A1 * | 12/2005 | Benkert et al. ...... 310/239 |

FOREIGN PATENT DOCUMENTS

| DE | 103 52 234 | 6/2005 |
| DE | 10352234 A1 * | 6/2005 |

(Continued)

OTHER PUBLICATIONS

Machine Translation DE10352234 (2005) and JP2002325400 (2002).*

*Primary Examiner*—Quyen Leung
*Assistant Examiner*—Jose A Gonzalez Quinones
(74) *Attorney, Agent, or Firm*—Michael J. Striker

(57) ABSTRACT

The invention relates to an electric motor (10) and to a method for producing said electric motor, especially for adjusting mobile parts in a motor vehicle. Said electric motor comprises a collector (36), arranged on an armature (38) and electrically contacted via hammer brushes (12). The armature (38) is surrounded by a lower housing part (32) and an upper housing part (34) which can be assembled in a radial direction (50) in relation to the armature (38). The hammer brushes (12) comprise one fastening element (26) each which engages directly in a seat (30) of the lower or upper housing part (32, 34).

14 Claims, 3 Drawing Sheets

FOREIGN PATENT DOCUMENTS

| | | | |
|---|---|---|---|
| EP | 1 251 604 | | 10/2002 |
| GB | 2180999 A | * | 4/1987 |
| GB | 2 365 631 | | 2/2002 |
| JP | 10-108402 | | 4/1998 |
| JP | 2002-325400 | | 11/2002 |
| JP | 2002325400 A | * | 11/2002 |
| WO | 02/075899 | | 9/2002 |
| WO | 2005/046025 | | 5/2005 |

* cited by examiner

ELECTRIC MOTOR WITH HAMMER BRUSHES

CROSS-REFERENCE TO RELATED APPLICATIONS

This application claims priority under 35 U.S.C. 119(a)-(d) to German patent application number DE 102005047428.4, filed Sep. 30, 2006.

BACKGROUND OF THE INVENTION

1. Field of the Invention

The present invention relates to an electric motor with hammer brushes and to a method for manufacturing such a motor, in particular for actuating moving parts in a motor vehicle.

2. Description of Related Art

DE 103 52 234 has disclosed an electric motor in which an armature shaft with a commutator mounted on it is supported between two housing shells that can be assembled radially. In this prior electric motor, hammer brushes are fastened, for example welded or riveted, by means of spring clips directly to the printed circuit board. After installation of the armature, the printed circuit board here is mounted radially, by means of which the carbon elements of the hammer brushes are positioned in relation to the commutator. Because of the adjustment of the brushes through positioning of the printed circuit board, it is relatively difficult to position the carbon elements precisely, which can result in the generation of unpleasant noise. In addition, such a system is not very flexible with regard to a structural change of the printed circuit board since this would also require a change of the brush holders. In addition, equipping the printed circuit board with the hammer brushes and producing the contact with a plug connector represent relatively complex assembly processes.

BRIEF SUMMARY OF THE INVENTION

The electric motor according to the present invention and its manufacturing method, with the characterizing features of their respective independent claims, have the advantage that by supporting the hammer brushes directly in a housing part that also supports the armature of the electric motor, the hammer brushes can be positioned more precisely in relation to the commutator. In this connection, completely independently of the printed circuit board or a brush-holding component, the hammer brushes are inserted into recesses formed into the housing part. By decoupling the hammer brushes from the printed circuit board, it very easy to vary the form and equipment of the printed circuit board without having to adapt the mounting of the hammer brushes. It is thus easier in particular to adapt the sensor system or various plug connectors to customer specifications. Furthermore, no additional brush-holding component is required, which would have to be inserted in an additional assembly step and then sealed. The motor housing can therefore be embodied very simply and cost-effectively by means of two housing shells that are very easy to seal in relation to each other.

Advantageous modifications and improvements of the features disclosed in the independent claims result from the steps taken in the dependent claims. In a particularly simple embodiment, the hammer brushes can be clamped into the housing part by means of a clamp element that is situated on the hammer brush. This eliminates the need for additional fastening means. The hammer brush, for example equipped with detent teeth, is simply inserted into the recess of the housing part and locked in detent fashion therein.

If the recess has a counterpart detent surface, then the detent teeth hook snugly into this detent stop, which is preferably composed of a material that is softer than that of the fastening element, for example plastic. Consequently, in a simple process, the hammer brush can be inserted into the recess until it reaches an end stop and at the same time, is reliably fixed in place by the hooking engagement of the teeth.

It is advantageous if the hammer brush has an insertion contact that is oriented so that during installation of the printed circuit board, the insertion contact is slid into a corresponding opening of the printed circuit board. Thus a mechanical connection to the hammer brush is produced during the process of installing the printed circuit board.

If the insertion contact is embodied with a resilient press-fitting zone, then during installation of the printed circuit board, the hammer brush is simultaneously also reliably contacted electrically by means of the press-fitting technique. This eliminates the need for soldering or other contacting methods.

So that the insertion contact has the necessary mechanical stability, it is advantageously produced of a different material than the spring clip. Then the insertion contact can be simply connected to the spring clip by means of riveting or welding, preferably before installation of the hammer brush.

It is advantageous if the detent teeth are embodied in a directly integral fashion together with the insertion contact. The detent teeth are then likewise composed of a harder material than the corresponding counterpart surface of the recess, thus allowing the detent teeth to better engage therein.

If the recess is embodied in the form of a pocket, which, in addition to the insertion opening, has an opening on another side, then the fastening element is reliably fixed in position on the one hand and the spring clip with the carbon element can simultaneously protrude from the latter opening in order to rest against the commutator.

In another embodiment, the recess has a guide rail on which the hammer brush can be slid into a detent position. In this case, the function of the guide element is in particular performed by the insertion element, which reaches, for example, through a gap of the guide rail.

If the electric motor has two hammer brushes, for example, which are situated on both sides of the armature shaft, then the printed circuit board can accommodate both insertion elements directly if the printed circuit board extends tangentially across the commutator. As a result, the carbon elements are connected to the current supply via very short electrical paths, thus reducing occurrences of electromagnetic interference. With this arrangement of the printed circuit board, it is simultaneously possible for a sensor system to be very favorably situated directly at the armature shaft.

So that no electrical contacting processes are required during the installation of the printed circuit board, in addition to the insertion contacts of the hammer brushes, the plug connector pins for the external electrical connection of the electric motor are preinstalled as insertion contacts in the lower shell or are injection molded into it. As a result, at the same time as the mechanical fixing of the printed circuit board by means of guide pins, all of the electrical contacts are also produced, thus eliminating the need for additional contacting methods.

Alternatively or in addition to the electrical connection of the carbon elements to the insertion contact via the spring clips, the carbon brush can have a carbon wire attached to it that electrically connects the brush directly to the insertion contact. This has the additional advantage that the spring clip can be mechanically damped by the manner in which the carbon wire is fastened.

Thanks to the manufacturing method of the electric motor according to the present invention, which motor can be completely assembled in the radial direction, it is possible to eliminate the separate installation process of the hammer brushes on the printed circuit board. The direct insertion of the fastening regions of the hammer brushes into the corresponding recesses of the lower housing part positions these hammer brushes directly and therefore very precisely in relation to the commutator. The radial installation of the printed circuit board completely connects it mechanically and electrically at the same time and in a single process step. The installation of the upper housing part does not interfere with the positioning of the hammer brushes. This completely eliminates the complex installation of an additional brush-holding component and its sealing in relation to the other housing parts.

In a preferred production method, the carbon brushes are inserted radially in relation to the armature so that the spring clips extend in the axial direction; the carbon elements are in particular formed by means of bevels so that they are able to assume their optimum sprung position when they are slid onto the commutator.

The insertion of press-fitting zones into the holes of the printed circuit board produces a good mechanical and electrical contact simultaneously and in a single process step, thus making it possible under some circumstances to eliminate an additional mechanical fixing. As a result, no special, complex process evolutions are required For the contacting of the hammer brushes.

BRIEF DESCRIPTION OF THE DRAWINGS

Various exemplary embodiments of a device according to the present invention are shown in the drawings and will be explained in greater detail in the description that follows.

DETAILED DESCRIPTION OF THE INVENTION

Figure 1:
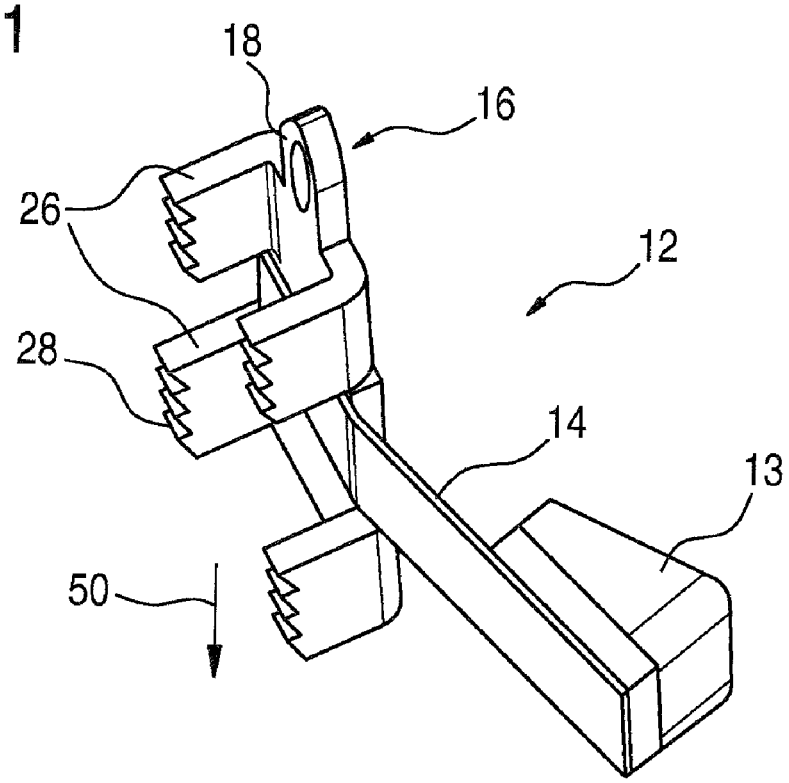
FIGS. 1 and 2 show two different exemplary embodiments of a hammer brush according to the present invention.

FIG. 1 shows a hammer brush 12 in which a carbon element 13 is mechanically and electrically connected to a spring clip 14. The hammer brush 12 also has an insertion contact 16 that is attached to the spring clip 14 by means of rivets 15 or by means of welding or another joining process. The spring clip 14 is manufactured of spring steel or of a Cu or CuBe material so that the carbon element 13 is connected to the insertion contact 16 in an electrically conductive fashion via the spring clip 14. For example, the carbon element 13 in FIG. 1 is welded to the spring clip 14, but in other embodiments, can also be riveted to the spring clip 14, inserted into it, or clamped to it. The insertion contact 16 has a press-fitting zone 18 formed onto it, which has resilient bridge pieces 20 that are elastically deformed upon insertion into a hole 22 of a printed circuit board 24. The bridge pieces 20 are press-fitted in relation to an inner wall 23 of the hole 22. The hammer brush 12 also has a fastening element 26 situated on it, which has a number of detent teeth 28 that snugly hook into place when inserted into a recess 30 of a lower housing part 32. The fastening element 26 in this embodiment is integrally manufactured out of the same material as the insertion contact 16, for example produced from a copper plate and embodied in the form of a bent, stamped component. The hammer brush 12 has four fastening elements 26, for example, that all extend approximately perpendicular to the plane of the spring clip 14. During installation of the hammer brush 12, the spring clip 14 then extends approximately parallel to a counterpart surface 52 of detent teeth 28, as shown in FIG. 4.

Figure 4:
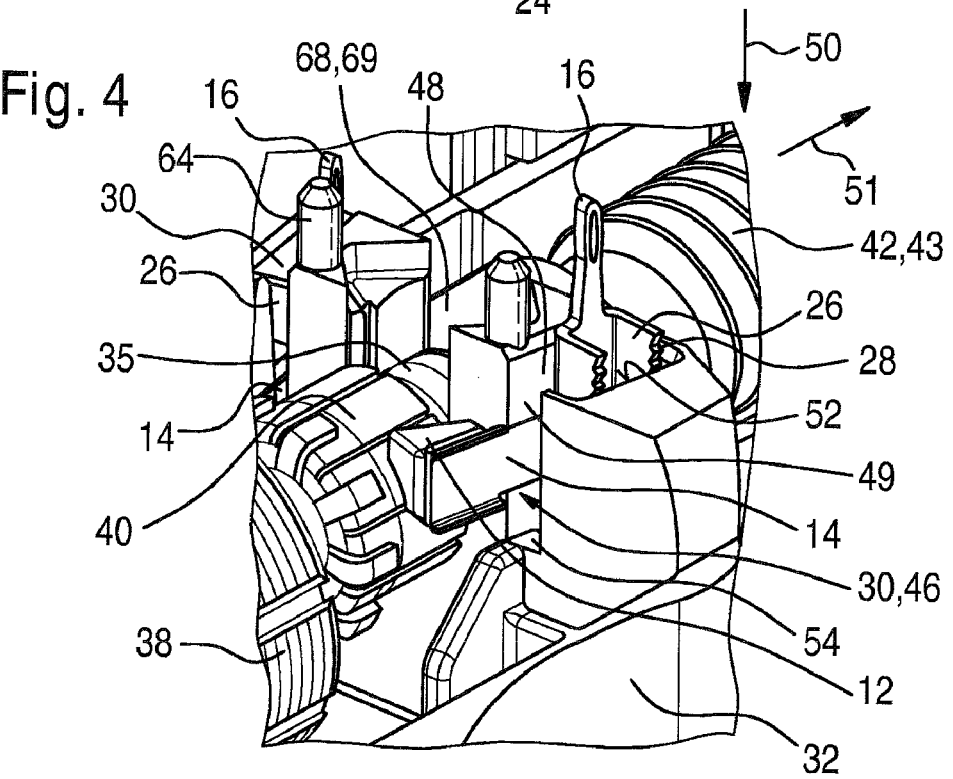
FIG. 4 shows the hammer brush according to FIG. 1 in the installed state.

In FIG. 4, the hammer brush 12 from FIG. 1 is shown in the installed state, after it has been inserted into the recess 30 of the lower housing part 32. The lower housing part 32 supports an armature shaft 36 with an armature 38 and a commutator 40 mounted on it by means of a bearing 35. As a drive element 42, the armature shaft 36 has a worm 43, which, by means of a driven element 44, actuates a moving part in the motor vehicle, for example. In the region of the commutator 40, on both sides of the armature shaft 36, the recesses 30, which are embodied in the form of open pockets 46, are formed directly into the lower housing part 32. The hammer brushes 12 are inserted in the installation direction 50 radial to the armature shaft 36 into openings 48 at the ends of the recesses 30. Each of the spring clips 14 with the carbon elements 13 protrudes out from its respective recess 30 through a lateral gap 49. Upon insertion in the installation direction 50, the carbon elements 13 slide over the commutator 40 so that in the final installed state, the spring clips 14 rest against the commutator 40 in a prestressed fashion. Each of the spring clips 14 extends from its recess 30 in the axial direction 51 to the commutator 40. During the insertion of the hammer brushes 12, the fastening element 26 wedges in the recess 30 by the engagement of the detent teeth 28 with the counterpart surface 52. The hammer brush 12 is inserted into the recess 30 until it comes to rest against a stop surface 54 of the recess 30. In this position, the insertion contacts 16 protrude up from the commutator 40 in the installation direction 50 so that after installation of the armature shaft 36 and the hammer brushes 12, the printed circuit board 24 can be installed in the radial direction 50, as depicted in FIG. 5.

Figure 5:
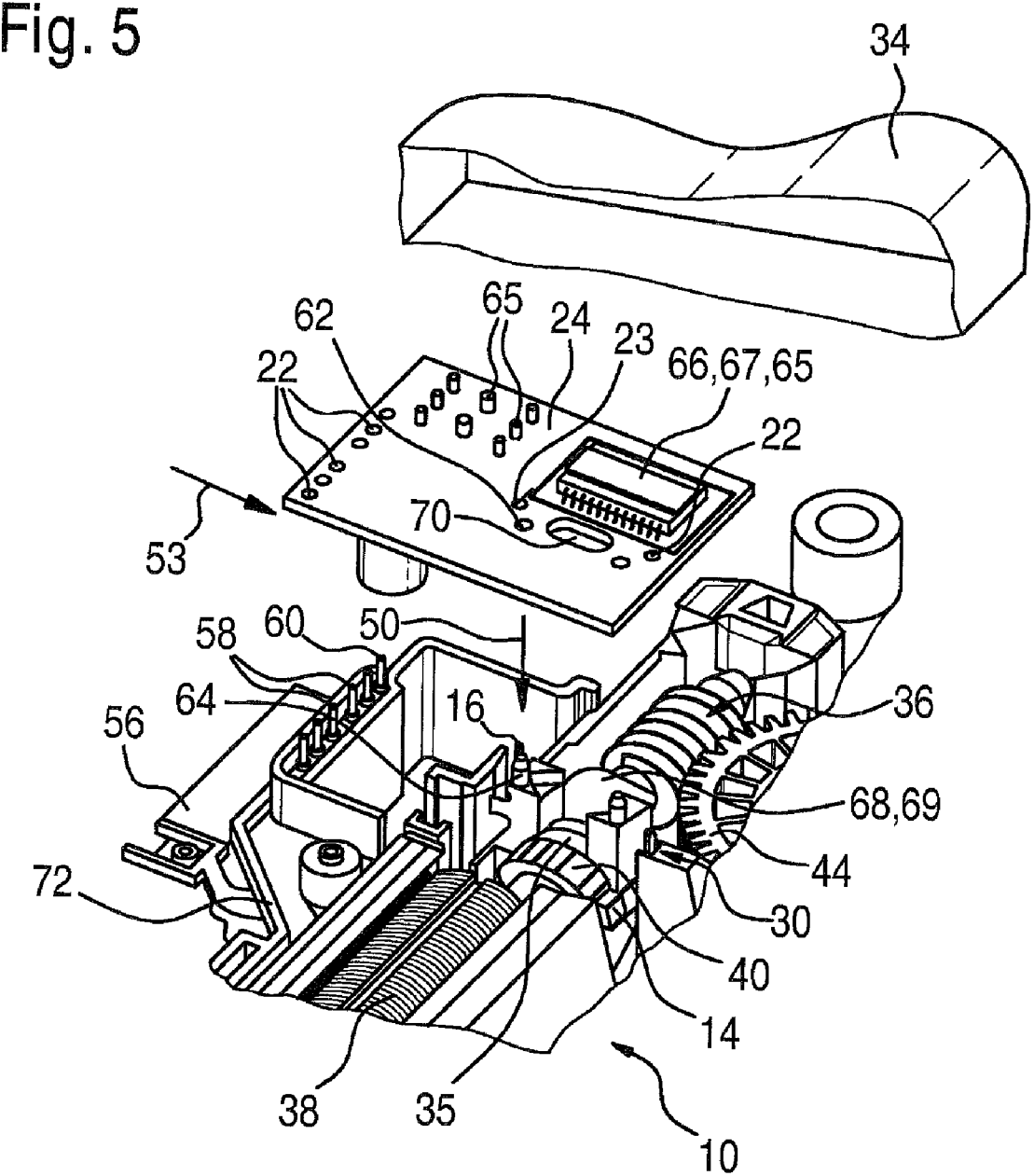
FIG. 5 shows the assembly process of the electric motor according to the present invention.

FIG. 5 shows the same electric motor 10 as FIG. 4, in the next assembly step. In the region of a connector plug 56, the lower housing part 32 has plug connector pins 58 whose insertion direction 60 likewise extends in the installation direction 50. Centering holes 52 of the printed circuit board 24 are now slid in the radial direction 50 onto corresponding guide pins 64 of the lower housing part 32. By means of the press-fitting technique, both the insertion contacts 16 of the hammer brushes 12 and the insertion regions 60 of the plug connector pins 58 are press-fitted into corresponding holes 22 of the printed circuit board 24. As a result, without additional contacting processes, by means of their insertion contacts 16, the hammer brushes 12 are electrically connected via the printed circuit board 24 to the connector pins 58 of the connector plug 56. The circuit board 26 extends tangentially to the commutator 40 and covers it completely in the tangential direction 53. A speed sensor 66, for example a Hall integrated circuit 67, is also situated on the printed circuit board 24 so that the sensor is positioned directly opposite a signal transmitter 68, for example an annular magnet 69 of the armature shaft 36. Additional components 65 such as relays, capacitors, diodes, interference suppression elements, and a microprocessor are also situated on the printed circuit board 24. The printed circuit board 24 also has an opening 70 through which, after installation of the upper housing part 34, not shown, the bearing 35 is press-fitted into the lower housing part 32. After its installation, the upper housing part 34 rests in the radial direction 50 directly against a seal 72 of the lower housing part 32 so that the two housing parts 32, 34 completely enclose the electric motor 10 and the transmission 42, 44 connected to it.

Figure 2:
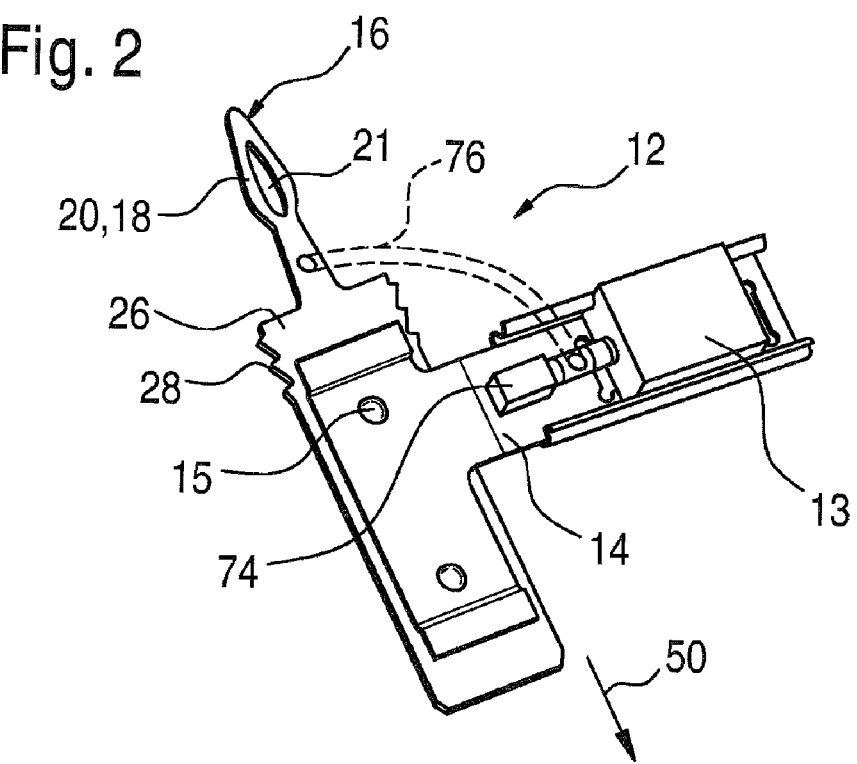

FIG. 2 shows another exemplary embodiment of a hammer brush 12 according to the present invention in which the carbon element 13 is inserted into the spring clip 14. The carbon element 13 has a connecting element 74 that electrically connects the carbon element 13 to the spring clip 14. In addition or alternatively, the carbon element 13 is connected directly to the insertion contact 16 of the hammer brush 12 by means of a connecting wire 76. If the hammer brush 12 has a connecting wire 76, then it is also possible for the spring clip 14 to be composed of a poor electrical conductor. In addition, the carbon wire 76 can be fastened in such a way that the hammer brush 12 is mechanically damped. As a fastening element 26, the detent teeth 28 are formed onto the region between the spring clip 14 and the insertion contact 16, extending in the plane of the spring clip 14. The insertion contact 16 in turn has a press-fitting zone 18 that is composed of two resilient bridge pieces 20 that enclose an eyelet 21. A hammer brush 12 of this kind can also be inserted into a recess 30, not shown, of a housing part 32 of the electric motor 10, with the detent teeth 28 wedging into the recess 30.

Figure 3:
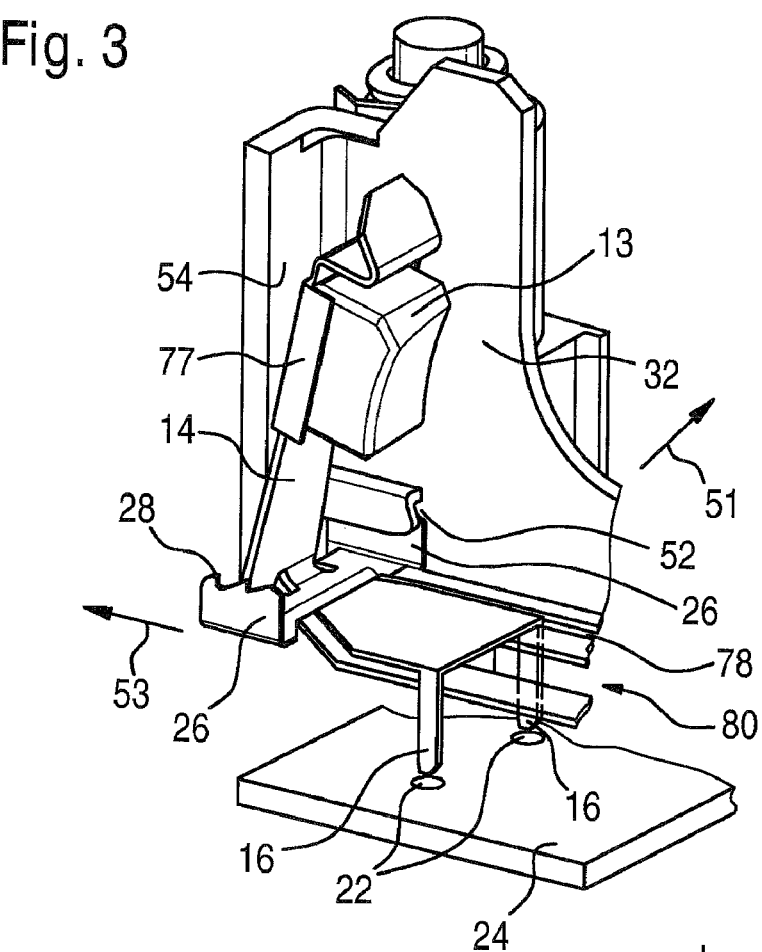
FIG. 3 shows another variant in the installed state.

FIG. 3 shows another embodiment of a hammer brush 12 in which the carbon element 13 is situated in a recess 77 of the spring clip 14. The spring clip 14 in this case is integrally joined, for example, to the insertion contact 16 and the fastening element 26. In order to install the hammer brush 12 into the housing part 32, the insertion contact 16 is inserted into a groove 78 of a guide rail 80 in the radial direction 50. Then the hammer brush 12 is slid in the tangential direction 53 along the rail 80 until the fastening element 26 engages in detent fashion with a corresponding counterpart surface 52 of the recess 30 and the spring clip 14 rests against a stop surface 54 of the recess 30. FIG. 3 schematically depicts only part of the housing 32; the two opposing sets of detent teeth 28 engage in the recess 30 in detent fashion at the same time. The insertion contacts 16 in this exemplary embodiment extend through the guide rail 80 so that the printed circuit board 24 is connected to the insertion contacts 16 from the other side of the guide rail 80. The spring clips 14 in this embodiment do not extend axially in relation to the armature shaft 36, but rather tangentially to the commutator 40.

It should be noted that with regard to the exemplary embodiments shown in the figures and contained in the description, there are numerous possibilities for combining the individual features with one another. It is thus possible, for example, to vary the concrete embodiment of the fastening elements 26 and their connection to the spring clip 14. For example, in lieu of the detent teeth 28, the hammer brushes 12 can also be fixed using other connecting means. It is likewise possible to adapt the form and attachment of the insertion contacts 16, the corresponding housing geometry, and the printed circuit board 24 used for the electric motor 10. The embodiment of the recesses 30 and their counterpart surfaces 52 in the lower housing part 32 depends on the concrete assembly geometry of the electric motor 10. The electric motor according to the present invention is preferably used for actuating windows or other moving parts in the motor vehicle and the housing is preferably composed of two shells 30, 32.

What is claimed is:

1. An electric motor (10), in particular for actuating moving parts in a motor vehicle, having a commutator (40) that is situated on an armature (38) and is electrically contacted by means of hammer brushes (12); wherein the armature (38) is enclosed by a lower housing part (32) and an upper housing part (34) that have the capacity to be assembled in the radial direction (50) in relation to the armature (38), wherein the hammer brushes (12) each have a fastening element (26) that engages directly in a recess (30) of the lower or upper housing part (32, 34) and an insertion contact (16) that engages in a corresponding hole (22) in a printed circuit board (24), wherein plug connector pins (58) are situated in the lower housing part (32), and wherein during installation of the printed circuit board (24), particularly as it is being slid onto centering pins (64), the plug connector pins are slid together with the insertion contacts (16) of the hammer brushes (12) into the printed circuit board (24).

2. The electric motor (10) as recited in claim 1, wherein the fastening element (26) is embodied in the form of a clamp element that in particular has detent teeth (28).

3. The electric motor (10) as recited in claim 1, wherein the recess (30) has a counterpart surface (52) made of plastic onto which the fastening element (26) snugly hooks.

4. The electric motor (10) as recited in claim 1, wherein the insertion contact (16) has a press-fitting zone (18), which, when inserted into the printed circuit board (24) using the press-fitting technique, rests resiliently against the inner wall (23) of the hole (22).

5. The electric motor (10) as recited in claim 1, wherein the hammer brush (12) has a carbon element (13) and a spring clip (14), which is connected to the insertion contact (16) by means of rivets (15) or by means of welding or adhesive.

6. The electric motor (10) as recited in claim 1, wherein the detent teeth (28) are integrally formed onto the insertion contact (16).

7. The electric motor (10) as recited in claim 5, wherein the recess (30) is embodied as a pocket (46) in the lower housing part (32) into which the hammer brush (12) is press-fitted perpendicular to the armature (38) and the spring clip (14) with the carbon element (13) protrudes through a lateral gap (49) from the pocket (46).

8. The electric motor (10) as recited in claim 1, wherein the recess (30) has a guide rail (80) for the insertion of the hammer brush (12) and the insertion contact (16) engages in the guide rail (80).

9. The electric motor (10) as recited in claim 1, wherein the printed circuit board (24) is situated tangential to the commutator (40) and completely covers it in the tangential direction (53).

10. The electric motor (10) as recited in claim 5, wherein the carbon elements (13) are electrically connected to the insertion contact (16) by means of carbon wires (76).

11. A method for manufacturing an electric motor (10), in which an armature (38) with a commutator (40) is accommodated by a lower housing part (32) and an upper housing part (34), comprising the following assembly steps:

inserting the armature (38) and the hammer brushes (12) in the radial direction (50) into the lower housing part (32), mounting the printed circuit board (24) in the radial direction (50) onto the lower housing part (32) comprising a plug connector situated thereon, including inserting the insertion contacts (16) situated on the hammer brushes (12) into a corresponding hole (22) in the printed circuit board (24) including sliding printed circuit board onto centering pins (64) as plug connector pins are slid together with the insertion contacts (16) of the hammer brushes (12) into the printed circuit board (24), and placing the upper housing part (34) in the radial direction (50) onto the lower housing part (32) and attaching it thereat.

12. The method as recited in claim 11, wherein spring clips (14) extend tangentially or axially in relation to the commutator (40) and carbon elements (13), after being installed onto the commutator (40), rest against the commutator (40) in a radially resilient, prestressed fashion.

13. The method as recited in claim 11, wherein when a printed circuit board (24) is installed, and is fixed mechanically and contacted electrically at the same time by means of a press-fitting technique.

14. The electric motor (1) as recited in claim 1, wherein a printed circuit board (24) is provided and fixed simultaneously mechanically and electrically.

* * * * *